United States Patent
Landi et al.

(10) Patent No.: US 6,951,210 B2
(45) Date of Patent: Oct. 4, 2005

(54) FEED AND CONTROL SYSTEM FOR AN INTERNAL COMBUSTION ENGINE FED WITH TWO DIFFERENT FUELS

(75) Inventors: Stefano Landi, Reggio Emilia (IT); Maurizio Togninelli, Felina (IT)

(73) Assignee: Landi Renzo S.p.A., Cavriago (IT)

( * ) Notice: Subject to any disclaimer, the term of this patent is extended or adjusted under 35 U.S.C. 154(b) by 0 days.

(21) Appl. No.: 10/614,823

(22) Filed: Jul. 9, 2003

(65) Prior Publication Data

US 2004/0025831 A1 Feb. 12, 2004

(30) Foreign Application Priority Data

Aug. 6, 2002 (IT) ..................................... MI2002A1793

(51) Int. Cl.[7] .............................................. F02M 21/02
(52) U.S. Cl. ...................................... 123/525; 123/575
(58) Field of Search ............................... 123/575, 525, 123/576

(56) References Cited

U.S. PATENT DOCUMENTS

| | | | | |
|---|---|---|---|---|
| 5,233,944 A | * | 8/1993 | Mochizuki | 123/1 A |
| 5,379,740 A | | 1/1995 | Moore et al. | |
| 5,526,797 A | * | 6/1996 | Stokes | 123/575 |
| 5,560,344 A | * | 10/1996 | Chan | 123/515 |
| 5,666,926 A | * | 9/1997 | Ferrera et al. | 123/525 |
| 5,735,253 A | | 4/1998 | Perotto et al. | |
| 5,755,211 A | * | 5/1998 | Koch | 123/525 |
| 6,035,837 A | | 3/2000 | Cohen et al. | |
| 6,250,260 B1 | * | 6/2001 | Green | 123/27 GE |
| 6,289,881 B1 | | 9/2001 | Klopp | |
| 6,378,489 B1 | * | 4/2002 | Stanglmaier et al. | 123/304 |
| 6,457,463 B1 | * | 10/2002 | McChesney et al. | 123/575 |
| 6,543,395 B2 | * | 4/2003 | Green | 123/27 GE |
| 6,543,423 B2 | * | 4/2003 | Dobryden et al. | 123/480 |
| 6,668,804 B2 | * | 12/2003 | Dobryden et al. | 123/480 |
| 2002/0007805 A1 | | 1/2002 | Green | |

FOREIGN PATENT DOCUMENTS

| | | |
|---|---|---|
| DE | 197 04 640 | 8/1998 |
| EP | 0 872 634 | 10/1998 |
| EP | 0 922 843 | 6/1999 |

* cited by examiner

Primary Examiner—Henry C. Yuen
Assistant Examiner—Jason Benton
(74) Attorney, Agent, or Firm—Young & Thompson

(57) ABSTRACT

An improved feed and control system for an internal combustion engine able to be fed with one or other of two fuels such as petrol and liquid gas or petrol and methane, the engine comprising a plurality of first members for introducing a first fuel into corresponding explosion chambers and a plurality of second members for introducing the second fuel into the explosion chambers, the first introduction members being commanded and controlled by a control unit which, on the basis of preselected parameters, acts on the first members such as to achieve optimum engine operation. The control unit also commands and controls the plurality of the second introduction members which feed the second fuel to the respective explosion chambers, the unit hence being the only unit for controlling the engine operation, independently of whether it is operated with the first or with the second fuel.

23 Claims, 6 Drawing Sheets

FEED AND CONTROL SYSTEM FOR AN INTERNAL COMBUSTION ENGINE FED WITH TWO DIFFERENT FUELS

BACKGROUND OF THE INVENTION

The present invention relates to a feed and control system for an internal combustion engine fed with two different fuels.

Internal combustion engines able to operate by burning a first fuel (petrol) or alternatively a second fuel (liquid gas or LPG or methane) have been known for some time. Such engines are used in so-called two-fuel vehicles.

These fuels are suitably fed to the engine via corresponding feed systems each currently comprising their own engine feed and operation devices. The fuels are fed into the engine explosion chambers by introduction members or injectors associated with each feed system and totally separate from each other. The engine hence comprises introduction members or injectors for the petrol and separate injectors for the gas.

Existing gas injection systems with multiple injectors (or multipoint injection systems) for two-fuel vehicles are known to be based on an engine control unit which controls the injection times for the petrol injectors (petrol ECU or electronic control unit) and a gas control unit which controls the injection times for the gas injectors (gas ECU). This can either operate independently of the petrol control unit (in which case the system is a replication or duplication of the petrol system) or can reprocess the output injection times from the petrol control unit (in which case it is known as a corrector or slave system for the signals generated by this latter). In the first case the control unit for the gas system constitutes an actual engine control system which is independent of the petrol system and requires various input signals originating from the engine (lambda probe, air temperature, water temperature, engine r.p.m., manifold pressure, etc.), whereas in the second case it is not independent, it generally having less inputs and its main task being to reprocess the first fuel injection times acquired for controlling the petrol injectors. In gas operation, the petrol system control signals are redirected to "emulation" loads (reactances which simulate the reactances of the petrol injectors) so that the petrol ECU continues to operate (executing its usual functions such as ignition management, idling control, diagnosis, etc) as if the engine were still fed with petrol. However, in traditional systems the gas injection times, under the same engine conditions, are generally different from those implemented by the petrol ECU, with consequent possible incorrect operation of the engine when fed with gas. The traditional systems are fairly complex and costly. Moreover, even in the most simple (and often efficient) corrector systems, the reprocessing of the injection times introduces delays and disturbances into the control chain of the original system, the performance of which is therefore modified in a pejorative sense.

In addition, with said known injection systems, there is a duplication of cabling within the engine, making the feed system for the second fuel costly both because of the use of such cabling and because of the time for its installation.

Internal combustion engines are also known in which a single control unit is provided for both the petrol injectors and the gas injectors.

DE19704640 relates to an engine comprising a plurality of nozzles arranged to feed two different types of fuel into the explosion chamber, a first fuel being used to "ignite" the second fuel. That text states that the engine can also operate just with the fuel used to ignite the second fuel.

In that text there is no clear description relative to a single control unit for feeding the different fuels through the various nozzles nor is there a clear description of any method for controlling the fuel emission nor, in particular, is operation with two alternative fuels described. In effect, according to that text, in a first method of engine operation the fuels are injected jointly into the engine whereas in a different method of engine operation only one of these fuels is used for said operation. Nothing is stated regarding the times for injecting the different fuels into the cylinder.

U.S. Pat. No. 6,035,837 describes a system or engine fed with two fuels. The engine comprises however a single series of injectors to which the two fuels are fed alternatively. It describes the use of a single control unit (ECU) which controls the opening of a valve receiving said two fuels, such that it feeds them to the engine alternatively. It also describes the control of any fuel mixture fed to the engine by measuring the conductivity and/or temperature and/or pressure within the conduit common to the injectors.

The US patent text does not provide for direct injector control; even in this case nothing is stated regarding the possibility of controlling parameters such as pressure and temperature of the second fuel such that the injection times for the two fuels are equal.

EP0922843 aims to solve the problem of maintaining the petrol operation system efficient even when the engine is fed with gas (liquid or methane). For this reason, the patent text under examination provides for electronic control means which oblige the engine to be restarted, after a stoppage during which the gas tank is filled, in the petrol operation mode only if a level increase in the gas tank is sensed. The text describes the presence of a single engine control unit both during gas operation and during petrol operation, said operation being conventional.

Nothing is stated in the text regarding the times for injecting said fuels into the cylinder.

Finally, EP0872634 relates to a control device for an engine fed with two fuels comprising, however, two separate units for controlling corresponding injectors during engine operation with different fuels. The unit controlling the gaseous fuel injectors operates in accordance with data present in the unit controlling the liquid fuel injectors. These data are modified by the gaseous fuel control unit to obtain operative signals for the injectors of this gaseous fuel.

SUMMARY OF THE INVENTION

An object of the present invention is to provide an improved system for feeding an internal combustion engine with one or other of two different fuels.

A particular object of the invention is to provide a system of the stated type which comprises a number of components less than the number in similar known systems, resulting in increased simplicity of said system compared with those already known.

Another object is to provide a system of the stated type which is of reliable use and has a lower plant construction time and cost than already known similar systems.

Another object is to provide a system of the stated type which provides greater engine control efficiency than known systems and which, compared with these latter, introduces lesser interference or disturbance to the engine control system when operating with the first fuel.

These and further objects which will be apparent to the expert of the art are attained by a feed and control system for an internal combustion engine fed with two different fuels, in accordance with the corresponding accompanying claims.

BRIEF DESCRIPTION OF THE DRAWINGS

The present invention will be better understood from the accompanying drawing, which is provided by way of non-limiting example and in which.

DESCRIPTION OF THE PREFERRED EMBODIMENTS

Figure 1:
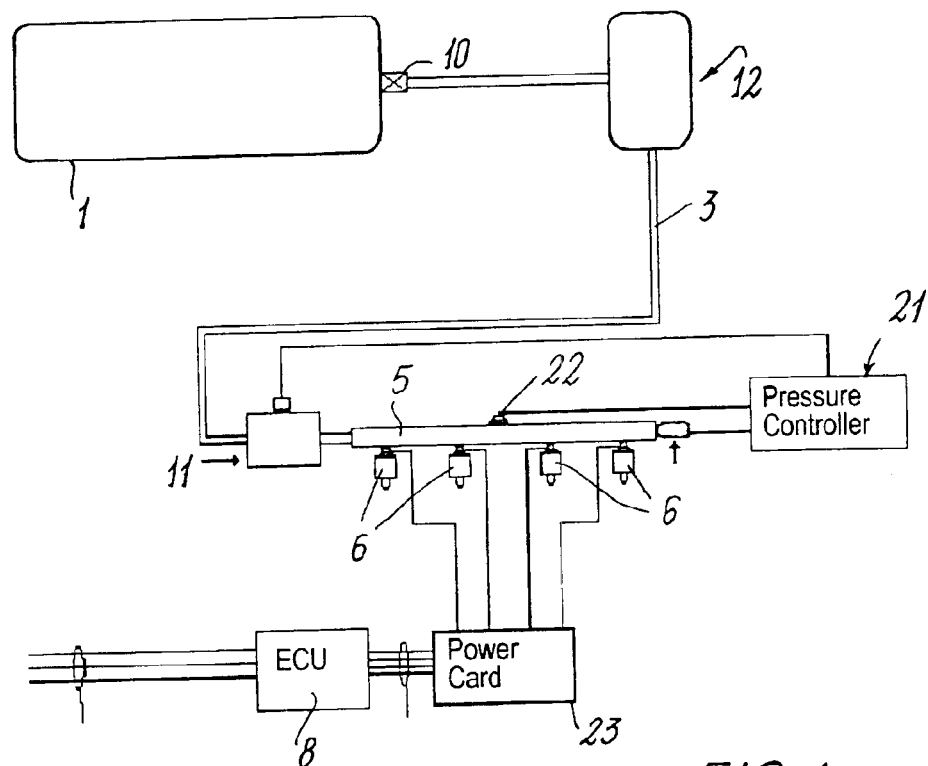
FIG. 1 is a schematic diagram of a system according to the invention.

With reference to said figures, a system according to the invention comprises a gas tank (LPG or methane) 1 connected via a usual conduit 3 to a common conduit or "common rail" 5 to which usual known gas injectors 6 are connected. These injectors are the members by which the gas is introduced into the explosion chamber of the cylinders of an internal combustion engine (not shown) which also operates on petrol. The injectors 6 are controlled by a control unit 8 arranged to also control usual members or injectors for introducing petrol into the explosion chambers. This unit 8 (ECU) is therefore the only unit for controlling fuel feed to the engine explosion chambers (via the injectors), independently of the type of fuel fed to these chambers. In addition, the unit 8 is the only unit which monitors correct engine operation against control parameters described in detail hereinafter.

A usual valve member 10 is connected into the conduit 3 leaving the tank. In this conduit there is also provided at least one pressure regulator member 11 positioned at the inlet to the conduit 5, with a possible further pressure regulator member (pressure reducer) 12 interposed between the member 11 and the gas tank 1.

The pressure regulator member 11 can be a usual proportional solenoid valve (shown in general form in FIG. 5) or a similar on-off device operating similar to an injector. In the embodiment shown in FIG. 5, the member 11 comprises a casing 13 housing an electric winding or coil 15 for operating a valve stem 16 having one end 17 arranged to intercept the conduit 3 and act as the valving element therefor.

Alternatively, the stem 16 can be driven by an electric motor, for example a stepping motor.

The proportional solenoid valve or member 11 is of known type, comprising return means 20 for the stem and valving element 16 and other components which will not be further described.

The operation of the member 11 is controlled by a unit 21 which controls the pressure within the conduit 5, said unit also controlling the temperature of the fluid present in this conduit via a known temperature sensor 22 associated with said common conduit 5.

Finally, in its most general form the system of FIG. 1 can comprise (but not necessarily so) a pilot-operation power card 23 enabling particular known gas injectors 6 to be used having a current absorption greater than that of the petrol injectors 26 (shown in FIGS. 2 and 3) and also controlled by said unit 8. The card 23 is not required if the gas injectors 6 have a current absorption (or an impedance) similar to that of the petrol injectors 26.

In the most general case in which the power card is used to pilot-operate the gas injectors, a known petrol injector emulation circuit 24 must always be used (see FIG. 2), from which the control signal for the power card is taken. In this case the emulation circuit 24 and the power card 23 are integrated into a single circuit 28. Signals V reach the emulation circuit (containing an impedance 30), from the unit 8 via a connection line 31, the power card receiving a signal T (which also reaches the emulation circuit 24 to switch petrol injector control to the emulation impedance) representative of switch-over of the engine operation from a first fuel to the second or vice versa. This occurs along a connection line 34 connected to a known feed change-over switch, not shown.

Figure 2:
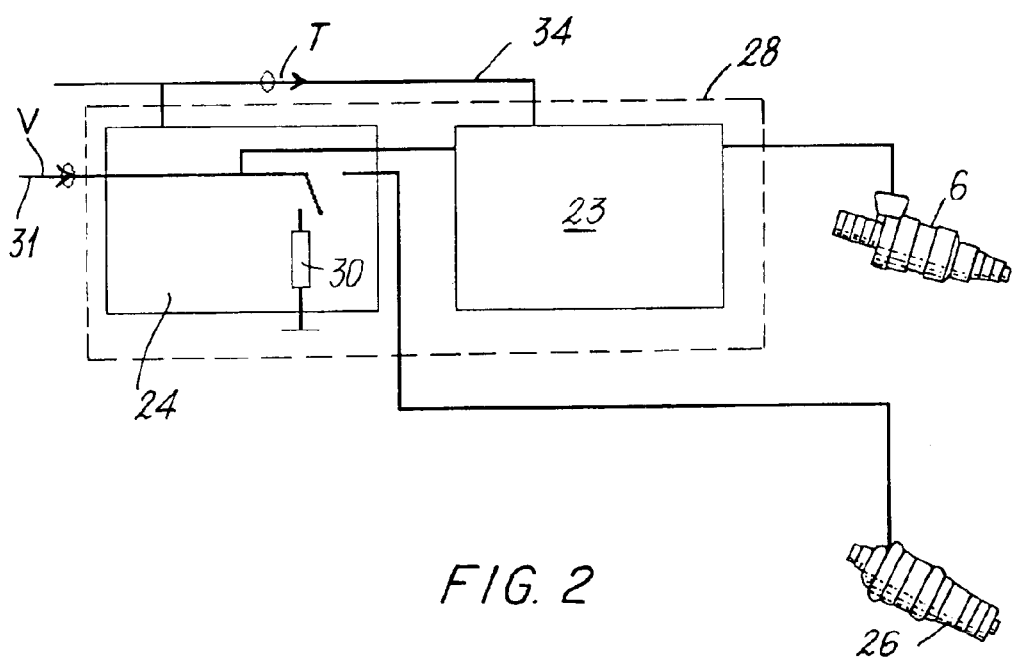
FIG. 2 is a schematic diagram of part of the system of FIG. 1.
Figure 3:
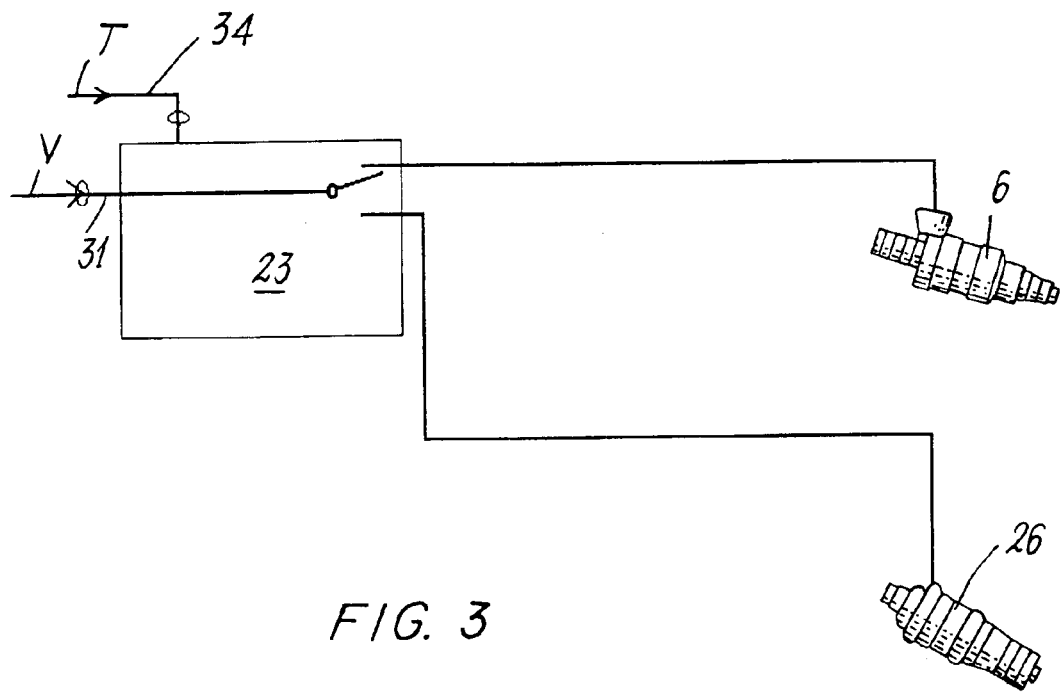
FIG. 3 is a different schematic diagram of that system part of FIG. 2.

If however the power card 23 is not used, the emulation circuit 24 for the petrol injectors 26 will also not be required as this function would be performed by the inductance of the gas injectors (see FIG. 3). In FIG. 3, those parts common with FIG. 2 are indicated by the same reference numerals.

According to the invention, a "two-fuel" system is described in which the control signals of the petrol control unit 8 are redirected, during gas operation, from the petrol injectors 26 to the gas injectors 6; the petrol control unit 8 hence controls the opening of these latter without however being aware that the fuel has been changed. The unit 8 must however enable the engine to operate correctly on changing fuel (from petrol to gas) without giving rise to any phase displacement in the optimum stoichiometric conditions for engine operability.

As is well known, when the control unit 8 operating on the petrol injectors 26 calculates and then implements the injection times, it follows an air/fuel relationship which generally has a dynamic pattern which also depends on the engine operation point. This air/fuel relationship is also controlled by the lambda probe (or equivalent measurement member) which measures the oxygen content of the engine exhaust gas. This probe is used for engine control in those countries in which precise regulations against atmospheric pollution are in force.

The petrol quantity to be injected into the explosion chamber at each cycle is calculated on the basis of various engine parameters acquired by suitable sensors (such as engine r.p.m., manifold pressure, air flowmeter, throttle plate angle, air temperature, water temperature, barometric pressure, etc.) which inform the control unit of the engine state and dynamics. This calculation also preferably considers the feedback of the oxygen sensor in the exhaust gas (lambda probe) which is known to indirectly provide information on the dynamic pattern of the air/fuel ratio at engine entry. In this respect, if a certain quantity of hydrocarbons is fed into the intake, these react during combustion with the oxygen present in the air (oxidation) and hence, on the basis of the grams of fuel fed and the grams of intake air, a certain oxygen quantity is present in the exhaust and can be read by the lambda probe. The hydrocarbon quantity in grams (Q) to be fed into the intake to obtain a suitable predetermined oxygen content in the exhaust is different, for the same grams of intake air, when the fuel changes, however a stoichiometric air/fuel ratio for each fuel used by the engine can be determined (petrol 14.7, LPG 15.6 and methane 17.2), such as to enable the same oxygen content in the exhaust to be obtained as that programmed for petrol (for example, in the case of methane, the quantity to obtain the same oxygen content in the exhaust is equal to 0.85 times that for petrol).

The stoichiometric ratio for a specific fuel is known to be that particular A/F value (air/fuel, these being expressed in grams, giving for example 14.7 for petrol, 17.2 for methane) for which oxidation of the hydrocarbon present in the air is complete. Hence in the stoichiometric state the oxygen molecules are exactly those necessary to oxidize all the hydrocarbon molecules present.

Knowing the number of grams of a first fuel (petrol) to obtain stoichiometry, the number of grams of the second fuel to maintain the desired stoichiometry can be obtained.

In this manner, for the gas injectors 6 to inject a gas quantity Qe equivalent (for the purposes of oxido-reduction or for oxygen in the exhaust) to that which the relative petrol injectors 26 would have injected as petrol, the gas pressure in the common conduit 5 is controlled by the member (pressure regulator 11) positioned at its inlet in such a manner as to suitably control the density (and hence the grams) of the gas injected into each explosion chamber. In this respect the following relationship exists:

$$\dot{m} = A P_1 \sqrt{2/RT} \Psi [g/S]; \tag{1}$$

in which: "dotted m" represents the time derivative (when stationary this coincides with the static flow) of the mass of gas flowing through the injector when open (g/s); A is the cross-section of the injector jet; P1 is the gas pressure in the rail; P2 is the gas pressure in the intake manifold; R is the perfect gas constant and $\Psi$ is an expression which depends on the ratio P2/P1 if (P2/P1)>$P_L$ (Laval pressure which for methane is about 0.547), i.e. when under subsonic flow conditions, whereas it becomes a constant (for example 0.473 for methane) if (P2/P1)<$P_L$, i.e. when under sonic flow conditions. From this it will be clear that as P1 is less than 1 bar in suction systems, for P2 greater than about 2 bar sonic flow conditions always exist and hence the quantity of gas injected per unit of time varies linearly with the gas pressure in the rail. In the case of subsonic flow the dependence on the pressure in the rail makes it more complex (square root, and also dependent on the manifold pressure) but the flow still always remains monotonic with pressure.

In reality, the control of the member 11 by the control unit 21 to achieve the desired mass of gas flowing from the conduit or from the injector should preferably also consider the gas temperature in the common conduit 5 so as to generate a reference value for the variable $P/\sqrt{T}$ to which the static flow is proportional and hence act on the member 11 so that the pressure has a value such that the said ratio remains as close as possible to the desired value (to obtain the gas mass flow required). However, if temperature variations are small, the value $\sqrt{T}$ can be neglected and considered constant.

Figure 4:
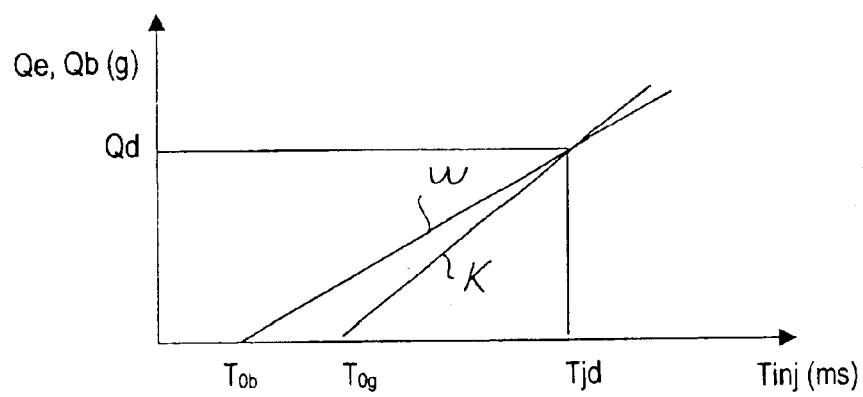
FIG. 4 is a graph showing injection time (TinJ) against fuel quantity delivered to the engine, illustrating the effects of the system of FIG. 1 on the gas feed to an internal combustion engine. In the figure Qb represents the petrol quantity and Qe the gas quantity delivered to the engine (in grams)

As already stated, by controlling the pressure in the common conduit 5 the static flow of the gas injector can be modified. This flow is represented by the half line K of FIG. 4 which also shows the flow of a petrol injector indicated by the half line W. In FIG. 4, Tog is the dead time of the gas injector, Tob being the dead time of the petrol injector.

As known to the expert of the art, the "dead time" of an injector indicates the additional time to be added to the opening command for transient compensation by the person calculating injection times, with reference to the static flow. During the opening transient the fuel delivered is less than could be calculated in static flow. Likewise during closure transients the delivery is in excess of the controlled amount. The difference between the deficit of grams injected on opening and the surplus of grams injected on closure represents a fuel quantity which has to be considered at each injection: if this quantity (positive or negative) is divided by the static flow, a time (positive or negative) is obtained which when added algebraically to the time calculated for the ideal injector without transients enables the desired fuel quantity to be injected.

Returning to FIG. 4, it can be firstly seen that both Qb and Qe appear on the vertical axis: different scales are used for this axis because, as already stated, for oxido-reductive purposes the following relationship exists:

$$Qe = K \, Qb$$

where K is a constant which changes on changing the second fuel (LPG or methane). For example, for methane, $$K = 0.85$$

The use of two different scales for petrol and the gas enables the same ordinate to correspond to the same oxido-reductive effects for the two fuels.

On this basis, indicating by Qd the petrol quantity needed to achieve the required engine performance, this corresponds to a precise injection time of Tjd. However as this injection time is implemented on the gas injector during gas operation, the slope of the half-line K (flow) for this injector must be adjusted so that it intersects the petrol injector line at (Tjd, Qd). It will be apparent that the static flow of the gas injector 6 must be controlled on the basis of the times Tjd implemented by the control unit 8 of the petrol system. In this manner the gas injectors 6 and the petrol injectors 26 are scaled, in the sense that for the same injection times the equivalent quantity of the injected fuels is the same.

Figure 5:
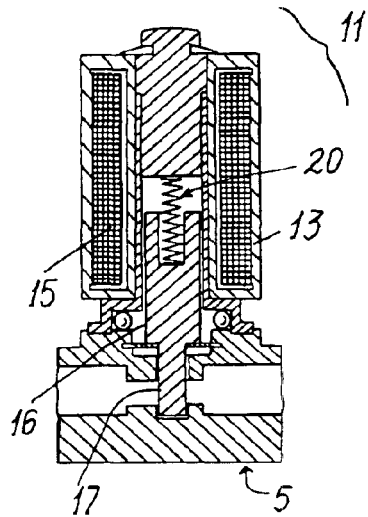
FIG. 5 is a section through a part of the system of FIG. 1.

In the example shown in the figures, the throughput is adjusted by the proportional solenoid valve 11 (or other equivalent pressure control member, as already described) shown in FIG. 5. By varying the cross-section for the gas flow entering the conduit 5, the proportional solenoid valve 11 controls the pressure in its interior; the stem 17 of the solenoid valve 11 can be operated either as in the figure by the current-controlled coil 15 (for example PWM current control), or by an electric motor which can be either a direct current motor or a stepping motor. The solenoid valve 11 controls the pressure in the conduit 5 by opening and closing the inlet port. The difference between the inlet flow and the outlet flow determines the gas pressure within the conduit 5.

Figure 6:
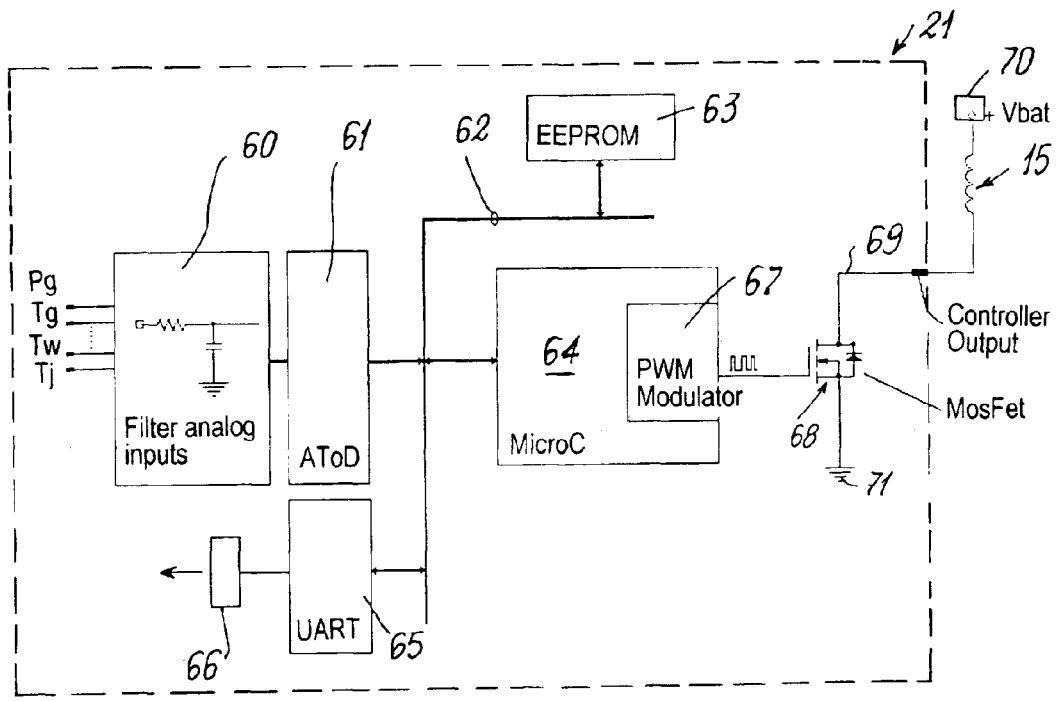
FIG. 6 is a block diagram representing a different structural part (hardware) of the system of FIG. 1.

The control member or solenoid valve 11 is controlled and operated by the control unit 21, a block diagram of which is shown in FIG. 6. The unit 21 essentially comprises a first bock 60 representative of a plurality of analog input filters;

it represents the filtrations effected on the analog inputs to "clean" them of the environmental noise present along the connection lines. This noise is generated by the electromagnetic fields present around those electrical conductors located within the engine through which electrical signals flow, or is generated by the electromagnetic fields produced in correspondence with the voltage generators present within the engine.

The basic analog inputs entering the filter block 60 are: the gas pressure in the rail (Pg), the gas temperature in the conduit 5 (Tg), the engine cooling water temperature (Tw) and the petrol injection control signals (Tj). These latter are required only if compensation is not provided by means of electrical components on the power card 23 for the dead time differences between the petrol injectors 26 and the gas injectors 6. In effect, the gas injector dead times (tog) also depend on the pressure difference (ΔP) existing between the conduit 5 and the engine intake manifold (this latter pressure varying as the engine load varies). To compensate this effect, which can be limited by a sufficiently high feed pressure in the conduit and by proper injector design, the manifold pressure could also be acquired to compensate its variations. In reality the fact of knowing the petrol injection times and the engine r.p.m. by means of the frequency with which the petrol injector commands are effected, already enables the manifold pressure to be obtained indirectly and enables the appropriate modifications to be made to the reference value generated for the rail pressure. Depending on the amount of control sophistication required, other analog inputs could be acquired (just as some of the listed inputs could be dispensed with) such as the angle of the throttle plate (alpha) in the intake duct. This however generally gives no problem if the number of channels of the analog-digital converter 61 (AtoD) positioned downstream of the filter block 60 is abundant (for example 8 channels), this enabling the control strategy to be modified by simply modifying the control algorithm for the unit 21 without modifying its physical structure (components).

The analog-digital converter 61 is connected to a data line (bus) 62 to which there are also connected an EEPROM memory 63 and a UART (universal asynchronous receiver and transmitter) block 65 which handles the serial communication between a microcontroller 64 (also connected to the line 62) and an external processor when this is connected to the unit 21 for its programming. The connection between the block 65 and the processor is via a logic gate 66. The EEPROM memory 63 contains the data and the program for the microcontroller 64; it should be noted that the memory 63, the UART block 65 and the converter 61 can be integrated into the microcontroller 64. This latter contains a peripheral control unit 67 shown in FIG. 6 as a PWM modulator, which enables pulse duration modulation (PWM) of a static switch or transistor 68 (for example an FET as in FIG. 6 or a BJT or an nMOS) positioned in a line 69 connecting the vehicle battery 70 to earth 71. The coil 15 of the member or solenoid valve 11 is positioned in the line 69. In this manner the peripheral unit 67 enables the microcontroller 64 to provide PWM control of the transistor 68 and hence PWM control of the current through the coil 15 of the solenoid valve 11 with consequent control of the flow of fluid and of its pressure within the common conduit 5.

The line 69 also represents the output of the unit 21.

Figure 7:
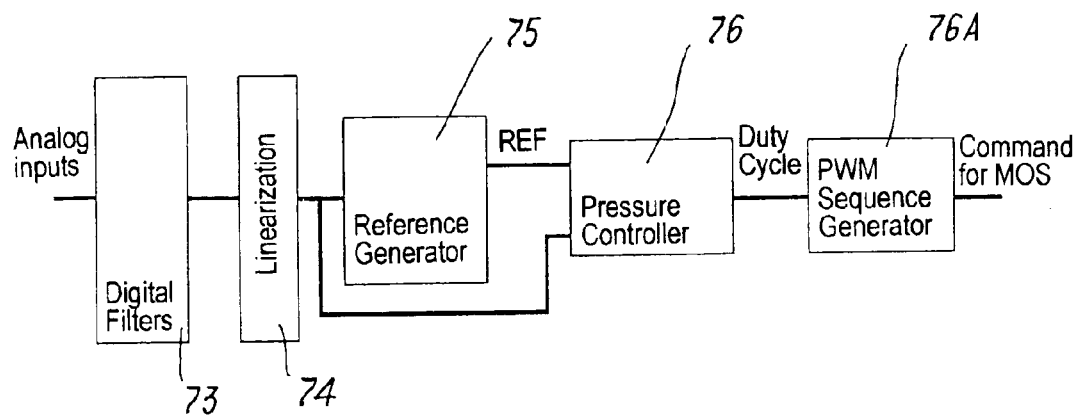
FIG. 7 is a block diagram showing the program modules (software) implemented in a part of FIG. 6.

A description will now be given of a possible algorithmic embodiment of the pressure controller, i.e. the structure of a plausible embodiment of an operative algorithm for the controller. FIG. 7 shows the block diagram of the software modules implemented within the pressure control system.

The operative algorithm is composed of five main blocks: the first block 73 provides digital filtration of the inputs, the next block 74 linearizes those sensors with a non-linear output (for example each NTC temperature sensor 22 connected to the conduit 5) and in the case of linear sensors puts the acquired physical quantity to the correct voltage scale. In other words the linearization block 74 converts the electrical input signal into a signal corresponding to the controlled physical quantity (for example pressure).

At this point the acquired variables can be processed by a "reference generator" 75 which, on the basis of an algorithm described hereinafter, creates a numerical reference value (Ref) for the variable $P/\sqrt{T}$, as reference for a pressure controller module 76 (formed within the pressure control unit 21). This latter, by basing itself on the acquired gas pressure and temperature, modulates the current duty cycle set on the proportional solenoid valve 11 such that the ratio between the pressure and the square root of the temperature of the gas within the conduit 5 coincides (dynamically) with that set by the reference generator 75.

It should be noted that the software module 75 is in reality a program algorithm with the task of calculating the "correct" value for the variable $P/\sqrt{T}$ which enables the correct quantity in grams of gas to be injected. The value generated as reference for operating the controller module 76 must however be compared with the value read by the sensors, i.e. the real value, as described hereinafter in relation to FIG. 10.

On receiving as input the reference value and the acquired system variables, the pressure controller module 76 generates (on an appropriate internal variable) the duty cycle value (e.g. 10%, 13%, etc.) which is used by a "PWM sequence generator" module 76A to program the internal peripheral unit of the microcontroller which generates the electrical control signal. Specifically, the "PWM sequence generator" module 76A, on receiving the "duty cycle" variable as input, provides as output (at an appropriate pin of the microcontroller 64) a PWM signal of voltage between 0 and 5V, of constant frequency, and duty cycle set by the pressure control module 76. The PWM sequence generator forms part of the peripheral unit 67 of FIG. 6. With regard to the reference generator 75, this is implemented in the state machines of FIGS. 8 and 9.

Figure 8:
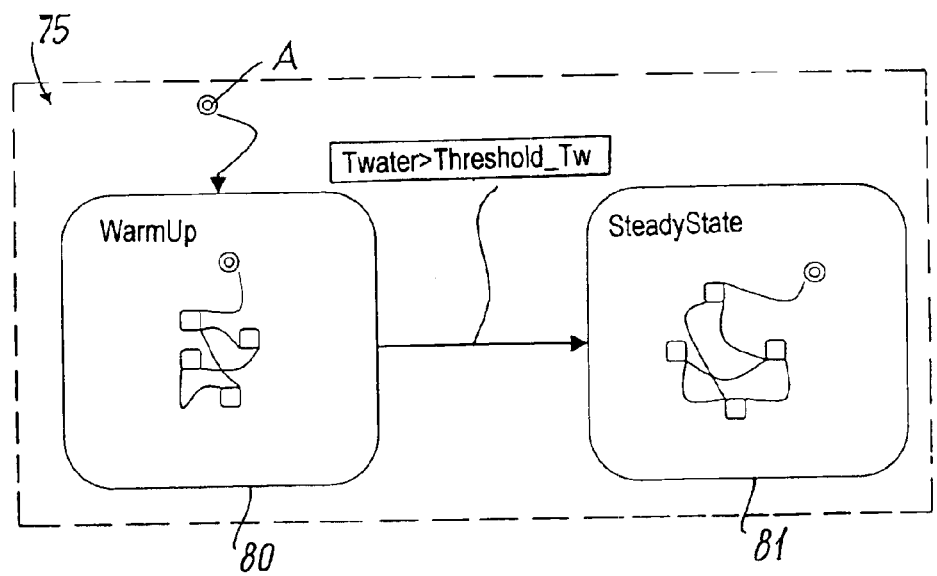
FIG. 8 shows a "state machine" representing the functions implemented by a component of the system of FIG. 1.
Figure 9:
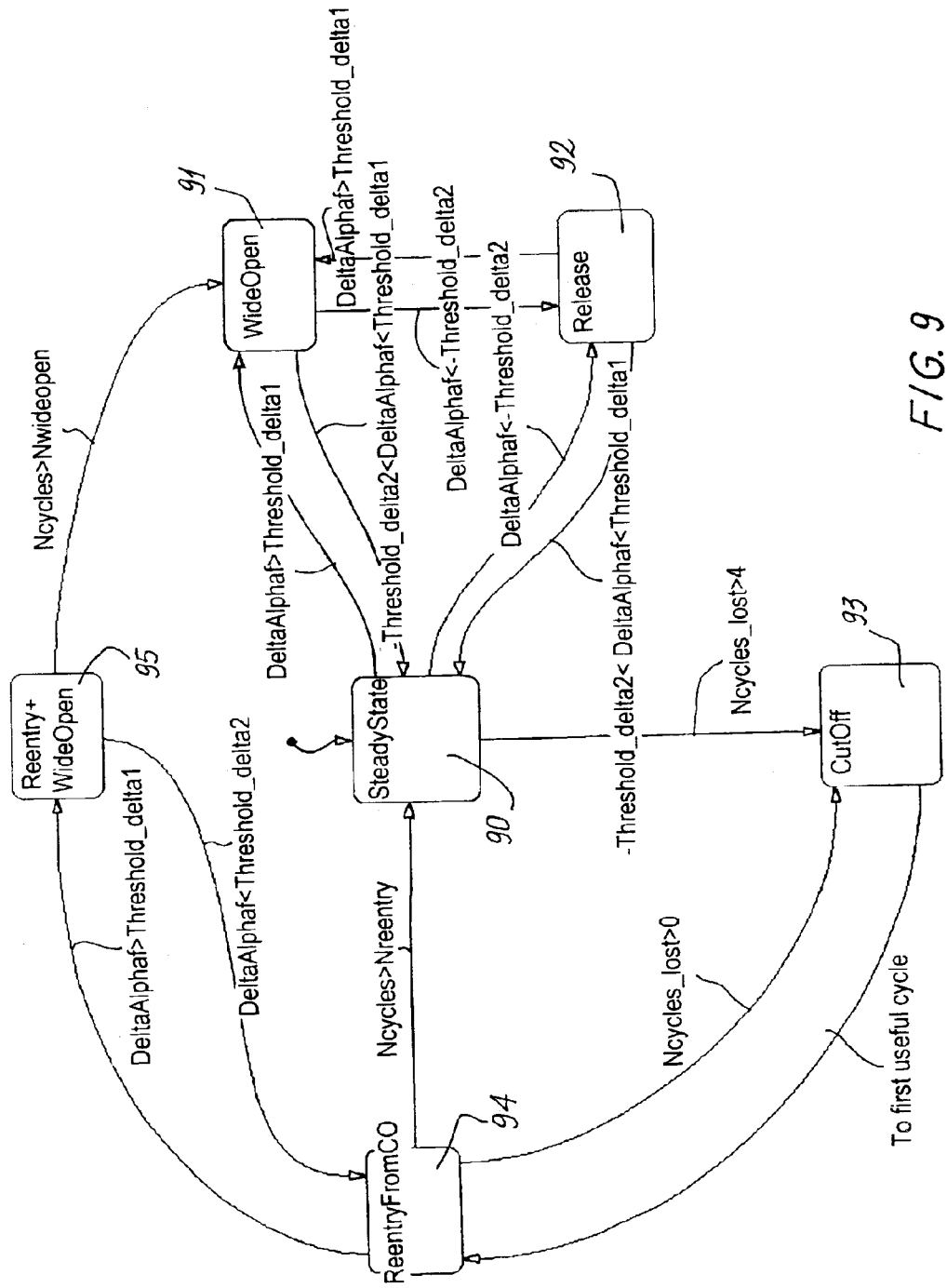
FIG. 9 shows a state machine representative of evaluation procedures executed within the component of FIG. 8.

More specifically, the state machine of the reference generator 75 consists of two principal macrostates 80 and 81 which in their turn execute a further state machine shown in FIG. 9. The two principal macrostates discriminate the engine warm-up state (starting and heating) from the steady state (engine water temperature having attained and exceeded a certain predetermined threshold). In FIG. 8, the initial state is indicated by A. Within each of the two macrostates the state machine of FIG. 9 is implemented representative of the internal states of the reference generator. For simplicity of representation the auto-rings are not shown in FIGS. 8 and 9.

In FIG. 9 (as in each macrostate of FIG. 8), the individual blocks 90, 91, 92, 93, 94 and 95 indicate the operational states of the reference generator 75 in a particular situation indicated by the macrostates of FIG. 8. The decision state in which the reference generator 75 lies, can be determined from FIG. 9 on the basis of the particular state of operation of the engine; a reference signal Ref is generated on the basis of this state in the manner described hereinafter.

From the aforegoing it is clear that two internal variables exist which identify the existing macrostate and the existing state respectively, their value influencing the reference value generated. The output of each state 90–95 of the state machine is, as stated, the reference value Ref ($=P/\sqrt{T}$), i.e.

the desired value, for that particular engine state, of the ratio of pressure to the square root of the temperature of the gas in the rail. This desired value is generally different for the various engine states. That which distinguishes the output of the two principal macrostates within which the state machine of FIG. 9 "operates" is that, whereas for the steady state macrostate 81 the output variable Ref of said state machine (variable representative of the desired pressure to be obtained in the common conduit 5) is not modified and is directly "copied" at the input (input variable) by the pressure control module 76, for the warm-up macrostate 80 the output of each individual state is "processed" in accordance with the following expression:

$$Ref_{WU} = K_{WU}(T_W) Ref;$$

$$0 < K_{WU} \leq 1 \qquad (3)$$

where $Ref_{WU}$ is the reference value modified for the warm-up state and $K_{WU}$ is a calibratable parameter in a vector enterable with the acquired water temperature values (Tw). The need to decrease the reference value during engine warm-up derives from the difference in nature between petrol and gas: as petrol is a liquid at ambient temperature it undergoes condensation and evaporation dynamics on the intake manifolds as functions of the engine temperature. During warm-up the petrol control unit tends to increase the quantity of fuel introduced compared with the steady state to compensate the accentuated condensation phenomenon.

In contrast, with reference to FIG. 9 there are six states, the state 90 or steady state being the stabilized state in which the engine operates at constant r.p.m. and manifold pressure; it is identified as the initial state (black dot with arrow) and the reference value is generated in the following manner:

$$Ref_{ss} = Ref(T_{j\_b}); \qquad (4)$$

i.e. it is mapped in a vector on the basis of the petrol injection times (see FIG. 4) to obtain scaling of the injectors. The wideopen state 91 and the release state 92 constitute the situation in which there is a transient on the throttle plate and hence on the manifold pressure. As the petrol condensation dynamics are influenced by the manifold pressure the reference value must generally be decreased during the wideopen state (acceleration transient) and increased during release (slow-down or braking). The variable $\Delta\alpha_F$ (DeltaAlpha indicated in FIG. 9) relates to the filtered derivative of the throttle plate angle whereas the various "Thresholds" are calibratable constants. In the wideopen state 91 the reference value can be calculated in the following manner:

$$Ref_{wideopen} = K_{\Delta\alpha\_s}(Rpm_f) \Delta\alpha_f Ref_{ss};$$

$$0 < K_{\Delta\alpha\_s} < 1 \qquad (5)$$

where the subscript f indicates that the variable is filtered, $K_{\Delta\alpha\_s}$ is a calibratable parameter in a vector in which interpolation is with the existing r.p.m., Rpm is the engine r.p.m. calculated via the frequency of the injection times, $\Delta\alpha$ is the throttle plate derivative and $Ref_{ss}$ is the reference value calculated by (4). Likewise in the release state 92:

$$Ref_{release} = K_{\Delta\alpha\_R}(Rpm_f) \Delta\alpha_f Ref_{ss};$$

$$1 \leq K_{\Delta\alpha\_R} < 1.5 \qquad (6)$$

where $K_{\Delta\alpha\_R}$ is a calibratable parameter in a vector in which interpolation is with the existing engine r.p.m. There are also the CutOff state 93 (the petrol system cuts off the feed when the accelerator pedal is released and the engine is at an r.p.m. exceeding a certain threshold (e.g. 1300)) and the Reentry-FromCO state 94 (Reentry from CutOff). During a feed cut-off the intake manifolds dry out and hence, on injection recommencement, there is a certain enrichment of mixing by the petrol system. The pressure objective must therefore be redefined by suitably decreasing it. The equal output for the two states can be defined by the following expression:

$$Ref_{CO} = (K_{CO} + (1 - K_{CO}) N_{cycles} / N_{reentry}) Ref_{ss};$$

$$0 < K_{CO} \leq 1 \qquad (7)$$

where Kco is a calibratable parameter in a vector based on the engine r.p.m., Ncycles is a variable (set to zero each time ReentryFromCO is entered and updated in ReentryFromCO and in Reentry+Wideopen) which counts the TDCs (i.e. the top dead centres of the pistons) which correspond in number (in a 4-cyl.) to the petrol injector commands used from leaving CutOff. Nreentry is a calibratable whole number, whereas in the state diagram Ncycles_lost is a variable (set to zero each time SteadyState and ReentryFromCO are entered) which counts the TDCs in which there has been no injection in the petrol system. The last state (95) is Reentry+Wideopen. In this the reference value must be even further lowered:

$$Ref_{R+S} = (K_{CO+}(1 - K_{CO}) N_{cycles} / N_{reentry}) K_{\Delta\alpha} \Delta\alpha \, Ref_{ss}; \qquad (8)$$

In the state diagram Nwideopen is a calibratable parameter.

Figure 10:
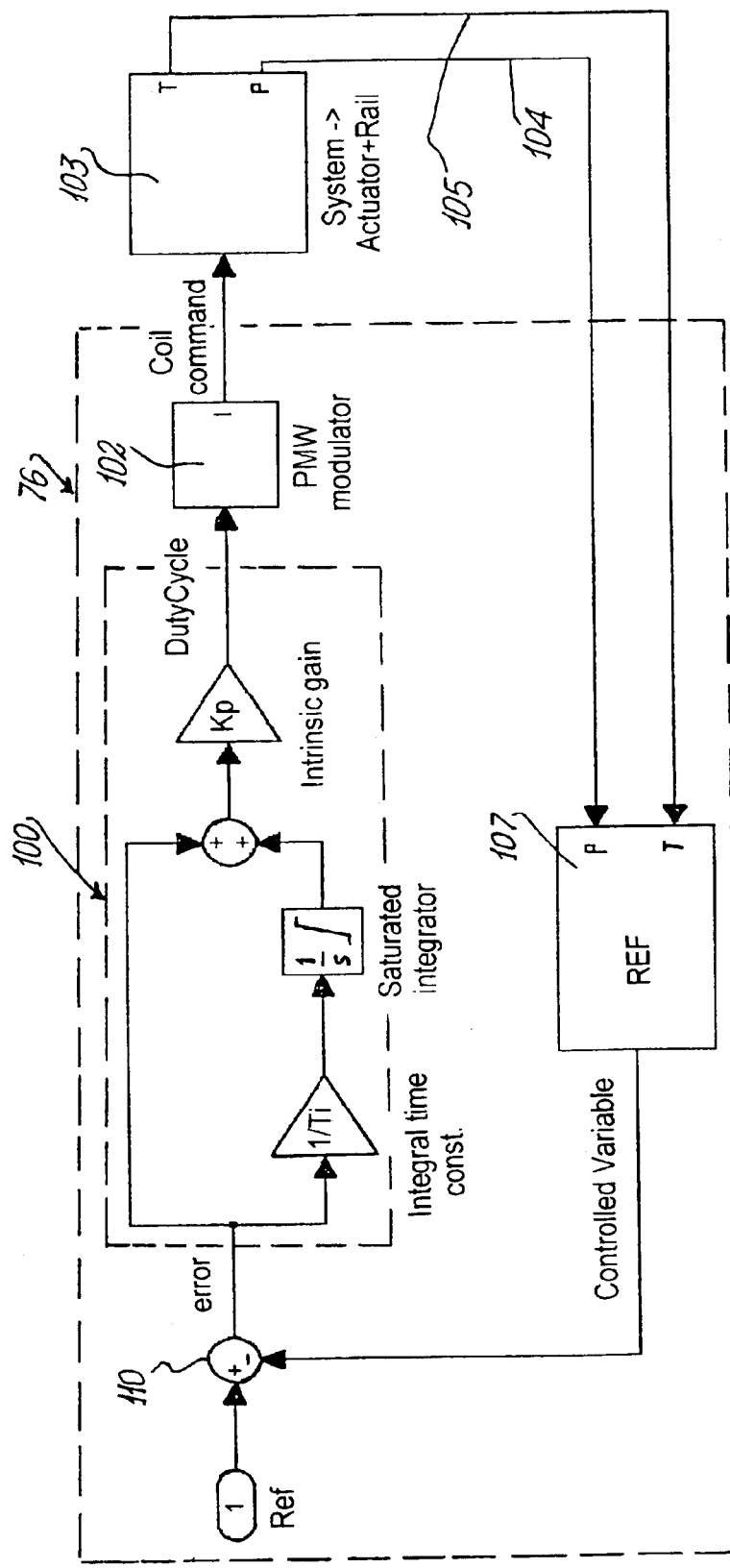
FIG. 10 is a block diagram showing the implementation of the program (software) executed by the system part of FIG. 6. The dashed-line part of FIG. 10 represents a block diagram of an algorithm implemented in a microprocessor part of FIG. 6.

In FIG. 10, the most outer dashed-line part implements a possible embodiment of the module 76 of FIG. 7, this latter representing overall a block diagram of the operative modalities (software implementation) of the pressure control unit 21. The unit 21 comprises a proportional integral controller (PI) 100, and a PWM modulator 102 from which a control signal emerges for the pressure control member which, in FIG. 10, forms part of a block 103 also containing the common conduit 5. From the block 103 feedback branches 104 and 105 extend to a block 107 which executes a simple mathematical operation $P/\sqrt{T}$, i.e. it calculates the present value of the controlled variable which is generally different from the reference value (Ref), (their difference $((P/\sqrt{T})_{ref} - (P/\sqrt{T}))$ giving the error on which the PI module operates to increase or decrease the duty cycle) on the basis of the pressure and temperature data measured and transmitted along these branches. It should be noted that $\sqrt{T}$ is preferably tabulated and memorized for suitable values of T. A feedback signal is generated by the block 107 for the direct measurement of $P/\sqrt{T}$ on the basis of the present measured pressure and temperature data which, when added algebraically to the reference value for the term $P/\sqrt{T}$ at a node 110, result in the generation of a possible error signal such as to involve possible correction of the duty cycle of the PWM modulator 102. The modulator operates at fixed frequency (for example 10 khz, which however depends on the inductance to be pilot-controlled, on the dissipation to be obtained at the transistor, on the current ripple, etc.) and requires the duty cycle as its single input for the square wave which it feeds as output to the power transistor.

The pressure control module 76 thus has, as its inputs, the reference value for the variable $P/\sqrt{T}$, and the gas pressure and temperature, its output being the duty cycle for the modulator. The inputs and outputs are converted at the operative algorithm level (software) into a like number of internal variables which are updated in real time. The block 107 which generates the present value of the controlled variable starting from the acquired physical variables has been considered as forming part of the controller itself. This latter therefore implements a feedback control on a physical quantity (P/√T) which is a function both of the pressure and of the temperature and is proportional to the mass flow through the injectors. The reference value is also expressed in units of this quantity. The PI block 100 has the tracking error as its input, and as its output the duty cycle for the PWM modulator (hence in the final analysis it is as though it has as its output the mean current passing through the coil winding).

More sophisticated controllers can be formed by introducing different gains based on the absolute value of the error (in particular smaller integral gain values for high error values and larger values for small error values) to improve the stability and dynamic response of the system. Even more sophisticated controllers can derive from system modelling (compensation with zero-poles, sliding mode, Lyapunov, etc.).

By virtue of the invention it is therefore possible to feed an internal combustion engine with one or other of two fuels, by providing a single control unit which controls the injection of the first and of the second fuel via first and second groups of injectors each provided for the injection of one type of fuel. Even after the feed has been switched from the first to the second fuel, the control unit acts on the injectors (those which feed the second fuel to the explosion chambers) as though it were acting on the first injectors for feeding the first fuel. In other words, the control unit, in activating the second injectors, maintains the activation modalities scheduled for the first injectors under the existing engine utilization conditions. This is achieved by virtue of the fact that the second fuel is fed to the second injectors at a considerable density and hence flow rate such as to enable the control unit to maintain the engine operating parameters scheduled for engine feed with the first fuel. This density is obtained by regulating the pressure of the second fuel in each conduit which feeds it to each injector (or by regulating the temperature of this second fuel if its pressure is maintained constant). Hence by controlling one of these variables (pressure and temperature), the feed of the second fuel to the injectors enables these injectors to feed a quantity of said fuel which is equivalent for stoichiometric and oxidoreductive purposes to that which, with the first fuel, enables correct engine operation to be achieved (i.e. in terms of certain predetermined parameters).

A preferred embodiment of the invention has been described. Others can however be implemented by the expert of the art on the basis of the aforegoing description, these hence falling within the scope of the accompanying claims. For example, the common feed conduit 5 for the second fuel can comprise not just a single volume as that described and represented, but a plurality of volumes connected to a single feed conduit originating from a tank. In the limit it can even consist of the volume of the individual pipes which feed the fuel from the pressure regulator member to the injectors. Moreover, with regard to the LPG (low pressure) systems, the pressure reducer 12 of FIG. 1 could be dispensed with by using the precaution of positioning an adequate heat exchanger on the body of the pressure regulator member 11 to evaporate the gas. Moreover, particularly on LPG systems (but possibly also on methane systems) the transient compensation strategies can be simplified especially if there is no constraint on pollutants.

What is claimed is:

1. A feed and control system for an internal combustion engine that is fed with two different fuels, the engine including plural first members (26) for introducing a first fuel into corresponding explosion chambers and plural second members (6) for introducing a second fuel into the corresponding explosion chambers, the system comprising:
   a control unit (8) the "controls both the" first and second members;
   a pressure regulator (11) in a conduit (3) through which the second fuel is fed from a tank to the second members, said pressure regulator being arranged and adapted to regulate a density and pressure of the second fuel; and
   control means (21) for controlling said pressure regulator so that times for introducing the second fuel into the explosion chambers are equal to times for introducing the first fuel into the explosion chambers so that said control unit controls the second members in the same manner as the first members for the same engine operating conditions, said control means being separate from said control unit.

2. The system as claimed in claim 1, wherein a quantity of the second fuel (Qe) stoichiometrically equivalent to a quantity of the first fuel (Qb) is introduced into the explosion chambers when the engine is fed with the second fuel, said stoichiometric equivalence (Qb, Qe) of the first and second fuels enabling their times of introduction into the explosion chambers to be maintained equal.

3. The system as claimed in claim 1, wherein said pressure regulator is a proportional solenoid valve having a valving element (17) arranged to act on the flow of the second fuel, said valving element being controlled by an actuator (15), the operation of which is subjected to the control means (21) at least on the basis of physical parameters related to conditions of the second fuel.

4. The system as claimed in claim 1, wherein said control means determines further present parameters related to the engine operation during the introduction of the second fuel into the explosion chambers and acts on said pressure regulator on the basis of a comparison of said present parameters with predetermined parameters.

5. The system as claimed in claim 3, wherein the physical parameters are the pressure and the temperature of the second fuel downstream of said pressure regulator.

6. The system as claimed in claim 4, wherein the present parameters are at least the temperature of the cooling water (Tw) of the engine and the times at which the second fuel is injected into the explosion chambers.

7. The system as claimed in claim 3, wherein said control means comprises at least one drive member (67) for said actuator.

8. The system as claimed in claim 7, wherein said actuator is electrically powered, said drive member acting on interruption means (68) for interrupting the electric power (69) in order to control operation of said actuator.

9. The system as claimed in claim 8, wherein said interruption means is a static switch (68), said drive member being a voltage modulator modulating the duration of command pulses of said static switch.

10. The system as claimed in claim 4, wherein said control means comprises a microcontroller (64) cooperating with a memory unit (63) in which the predetermined parameters are memorized, translation means (60, 61) for comparing the present parameters with corresponding ones of the predetermined values, and connection means (65, 66) for connection to an electrical processor external to the system, which is arranged to feed the predetermined values into said memory unit.

11. The system as claimed in claim 10, wherein said translation means comprises filters and an analog/digital converter (61), said connection means comprising a UART block (64) and logic gate (66).

12. The system as claimed in claim 10, wherein said control means is part of said pressure regulator.

13. The system as claimed in claim 10, wherein said control means is separated from said pressure regulator.

14. The system as claimed in claim 8, wherein said control means cooperates with reference generator (75) and with a pulse sequence generator member (76) connected to said interruption means.

15. The system as claimed in claim 14, wherein said reference generator comprises means for evaluating existing operation macrostates of the engine and means for evaluating existing operation states of the engine, said macrostates comprising engine warm-up and its steady-state operation, the operation states being internal to each macrostate and comprising the constant operating conditions state (90), the acceleration transient state (91), the release or deceleration and/or braking state (92), the feed cutoff state (93) if the engine operates at high r.p.m. or with the pedal released, the state (94) of reentry from said feed cutoff state (93) and the state (95) of reentry from said feed cutoff state (93) followed by an acceleration transient.

16. The system as claimed in claim 1, further comprising means (23) between said control unit and the second introduction members for increasing the intensity of a current absorbed by the second members compared with a current generated by said control unit.

17. The system as claimed in claim 16, further comprising, for emulating the impedance of the first members a circuit (24) interposed between said control unit and said means (23) for acting on the intensity of the current fed to the second members.

18. The system as claimed in claim 1, wherein the conduit is a common conduit (5) for all the second members downstream of said pressure regulator.

19. The system as claimed in claim 1, wherein the conduit comprises a plurality of conduits which are each connected to at least one second member and are positioned downstream of said pressure regulator to feed the second fuel to the second members.

20. A method of feeding and controlling operation of an internal combustion engine that is fed with two different fuels, the engine including plural first members (26) for introducing a first fuel into corresponding explosion chambers and plural second members (6) for introducing a second fuel into the corresponding explosion chambers, the engine having a control unit (8) that controls both the first and second members;

regulating a density and pressure of the second fuel in a pressure regulator (11) in a conduit (3) through which the second fuel is fed from a tank to the second members; and controlling the pressure regulator with a controller (21) separate from the control unit so that times for introducing the second fuel into the explosion chambers are equal to times for introducing the first fuel into the explosion chambers so that the control unit controls the second members in the same manner as the first members for the same engine operating conditions.

21. The method as claimed in claim 20, wherein the controller controls the pressure regulator to feed the second fuel to the second members in a quantity (Qe) equivalent for oxido-reduction purposes to a quantity (Qb) of the first fuel.

22. The system as claimed in claim 20, wherein the density of the second fuel is controlled by controlling and regulating the pressure in at least one conduit in which the second fuel is present and to which the second members are connected.

23. The system as claimed in claim 20, wherein the density of the second fuel is controlled by controlling the temperature of the second fuel when it is present in at least one conduit to which the second members are connected.

* * * * *